United States Patent
Lee et al.

(10) Patent No.: US 8,204,917 B2
(45) Date of Patent: Jun. 19, 2012

(54) APPARATUS, METHOD, AND COMPUTER PROGRAM PRODUCT THEREOF FOR STORING A DATA AND DATA STORAGE SYSTEM COMPRISING THE SAME

(75) Inventors: Da-Gang Lee, Taipei (TW); Hung-Jyun Mu, Taipei (TW); Chun-Sho Lee, Taipei (TW); Tei-Wei Kuo, Banciao (TW); Pei-Lun Suei, Fongyuan (TW); Rong-Jhang Liao, Tainan (TW); Yung-Feng Lu, Taishan Township, Taipei County (TW)

(73) Assignee: Institute for Information Industry, Taipei (TW)

( * ) Notice: Subject to any disclaimer, the term of this patent is extended or adjusted under 35 U.S.C. 154(b) by 476 days.

(21) Appl. No.: 12/197,877

(22) Filed: Aug. 25, 2008

(65) Prior Publication Data

US 2010/0023535 A1 Jan. 28, 2010

(30) Foreign Application Priority Data

Jul. 23, 2008 (TW) ................................. 97127953 A (51) Int. Cl.
*G06F 17/30* (2006.01)
(52) U.S. Cl. ......................... 707/812; 707/747; 707/758
(58) Field of Classification Search ........................ None
See application file for complete search history.

(56) References Cited

U.S. PATENT DOCUMENTS

| | | | |
|---|---|---|---|
| 6,430,626 B1 * | 8/2002 | Witkowski et al. ........... | 709/249 |
| 7,080,072 B1 * | 7/2006 | Sinclair ................................ | 1/1 |
| 7,248,585 B2 * | 7/2007 | Kohn et al. .................... | 370/392 |
| 7,571,852 B2 * | 8/2009 | Kwon et al. .................... | 235/382 |
| 7,801,868 B1 * | 9/2010 | Kaminski, Jr. ................ | 707/687 |
| 7,840,816 B2 * | 11/2010 | David et al. .................... | 713/176 |
| 7,870,604 B1 * | 1/2011 | Guichard et al. ............... | 726/15 |
| 2006/0265568 A1 * | 11/2006 | Burton .......................... | 711/216 |
| 2009/0157601 A1 * | 6/2009 | Lee et al. ........................ | 707/2 |
| 2009/0240946 A1 * | 9/2009 | Yeap et al. .................... | 713/176 |

* cited by examiner

*Primary Examiner* — Debbie Le
(74) *Attorney, Agent, or Firm* — Patterson Thuente Christensen Pedersen, P.A.

(57) ABSTRACT

An intermediary apparatus, an intermediary method, and a computer program product thereof for storing data in a storage apparatus, and a data storage system comprising the same are provided. The storage apparatus has a storage zone with a signature field, and the signature field stores a first signature value. The data has index information and a data signature value. After searching out the storage zone according to the index information, the intermediary apparatus extracts the first signature value from the storage zone, and then determines if the data has been stored in the storage zone according to the first signature value and the data signature value. If not, the intermediary apparatus writes the data into the storage zone; otherwise, ignores the data.

17 Claims, 4 Drawing Sheets

APPARATUS, METHOD, AND COMPUTER PROGRAM PRODUCT THEREOF FOR STORING A DATA AND DATA STORAGE SYSTEM COMPRISING THE SAME

This application claims the benefit of priority based on Taiwan Patent Application No. 097127953 filed on Jul. 23, 2008 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to an intermediary apparatus, an intermediary method, and a computer program product thereof for storing data in a storage apparatus, and a data storage system comprising the same. More specifically, the present invention relates to an intermediary apparatus, an intermediary method, and a computer program product thereof for storing data in a storage apparatus according to a signature value of the data, and a data storage system comprising the same.

2. Descriptions of the Related Art

In the digital era, databases or database systems have become indispensable elements in the modern life. Most people have occasions to interact with a database nearly every day, for example, when doing shopping online, withdrawing or depositing money in a banking institution, or when a warehouse keeper manages the inventory. In other words, the advent of the databases or database systems has made the use, analysis and management of data more efficient.

In generally, when data is to be stored in a database or a database system, an index will be created at first for convenience of subsequent retrieval. To avoid waste of the storage space, prior to storage of new data, it has to be determined whether the new data has already existed in the database by checking the existing data already stored in the database. If the new data already exists, re-storage of the new data will be abandoned to save the storage space in the database; otherwise, the new data will be stored. Specifically, when new data is to be stored in a storage zone of the database, a linear search or a binary search is conventionally carried out to determine whether the new data has already been stored in the storage zone of the database. However, when there is numerous data in the storage zone, it will take considerable time and system resources to determine whether new data has already existed in the database, causing degradation in overall efficiency of the database and consequent degradation in performance of the database.

Accordingly, it is highly desirable in the art to effectively shorten the time duration of confirming existence of new data in a database and reduce consumption of system resources in the database when confirming whether the new data has already existed in the database, thereby to improve operational efficiency of the database.

SUMMARY OF THE INVENTION

One objective of the present invention is to provide an intermediary apparatus for storing data in a storage apparatus. The storage apparatus has a storage zone with a signature field storing a first signature value, and the data has an index information and a data signature value. The intermediary apparatus comprises a processing module and a writing module. The processing module is configured to search out the storage zone from the storage apparatus according to the index information, extract the first signature value from the signature field of the storage zone, generate a second signature value according to the data signature value and the first signature value, and determine that the data has not been stored in the storage zone by comparing the first signature value with the second signature value. The writing module is configured to write the data into the storage zone and update the signature field according to the second signature value.

Another objective of the present invention is to provide an intermediary method for storing data in a storage apparatus. The storage apparatus has a storage zone with a signature field storing a first signature value, and the data has an index information and a data signature value. The intermediary method comprises the following steps of: (a) searching out the storage zone from the storage apparatus according to the index information; (b) extracting the first signature value from the signature field of the storage zone; (c) extracting the data signature value from the data; (d) generating a second signature value according to the first signature value and the data signature value; (e) determining that the data has not been stored in the storage zone by comparing the second signature value with the first signature value; (f) writing the data into the storage zone in response to the step (e); and (g) updating the signature field according to the second signature value.

Yet a further objective of the present invention is to provide a computer program product for being run on a computer to store data in a storage apparatus. The storage apparatus has a storage zone with a signature field storing a first signature value, and the data has an index information and a data signature value. The program executes a first code, a second code, a third code, a fourth code, a fifth code, a sixth code, and a seventh code. The first code is for searching out the storage zone from the storage apparatus according to the index information. The second code is for extracting the first signature value from the signature field of the storage zone. The third code is for extracting the data signature value from the data. The fourth code is for generating a second signature value according to the data signature value and the first signature value. The fifth code is for determining that the data has not been stored in the storage zone by comparing the second signature value with the first signature value. The sixth code is for writing the data into the storage zone in response to the fifth code. The seventh code is for updating the signature field according to the second signature value.

Yet another objective of the present invention is to provide a data storage system. The data storage system comprises a receiving interface, a storage apparatus, and an intermediary apparatus. The receiving interface is configured to receive a data, wherein the data has an index information and a data signature value. The storage apparatus has a storage zone with a signature field storing a first signature value. The intermediary apparatus is configured to store the data in the storage apparatus, and comprises a processing module and a writing module. The processing module is configured to search out the storage zone from the storage apparatus according to the index information, extract the first signature value from the signature field of the storage zone, generate a second signature value according to the data signature value of the data and the first signature value, and determine that the data has not been stored in the storage zone by comparing the first signature value with the second signature value. The writing module is configured to write the data into the storage zone and update the signature field according to the second signature value.

The present invention determines whether data has already been stored in a storage zone of a storage apparatus according to a signature value stored in a signature field of the corresponding storage zone and a data signature of the data itself. Accordingly, prior to storage of each new data in the storage zone, it is unnecessary to compare the new data with each data that has already been stored in the storage zone to confirm whether the new data has already been stored. Hence, the time spent in confirming whether new data has already been stored in the database is effectively reduced, thus overcoming the shortcoming of the conventional techniques.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, descriptions of these embodiments are only intended to illustrate rather than to limit the present invention. It should be appreciated that, in the following embodiments and the attached drawings, elements not related directly to the present invention are omitted from illustration; and dimensional relationships among individual elements in the attached drawings are illustrated only for ease of understanding, but not to limit the actual scale.

Figure 1:
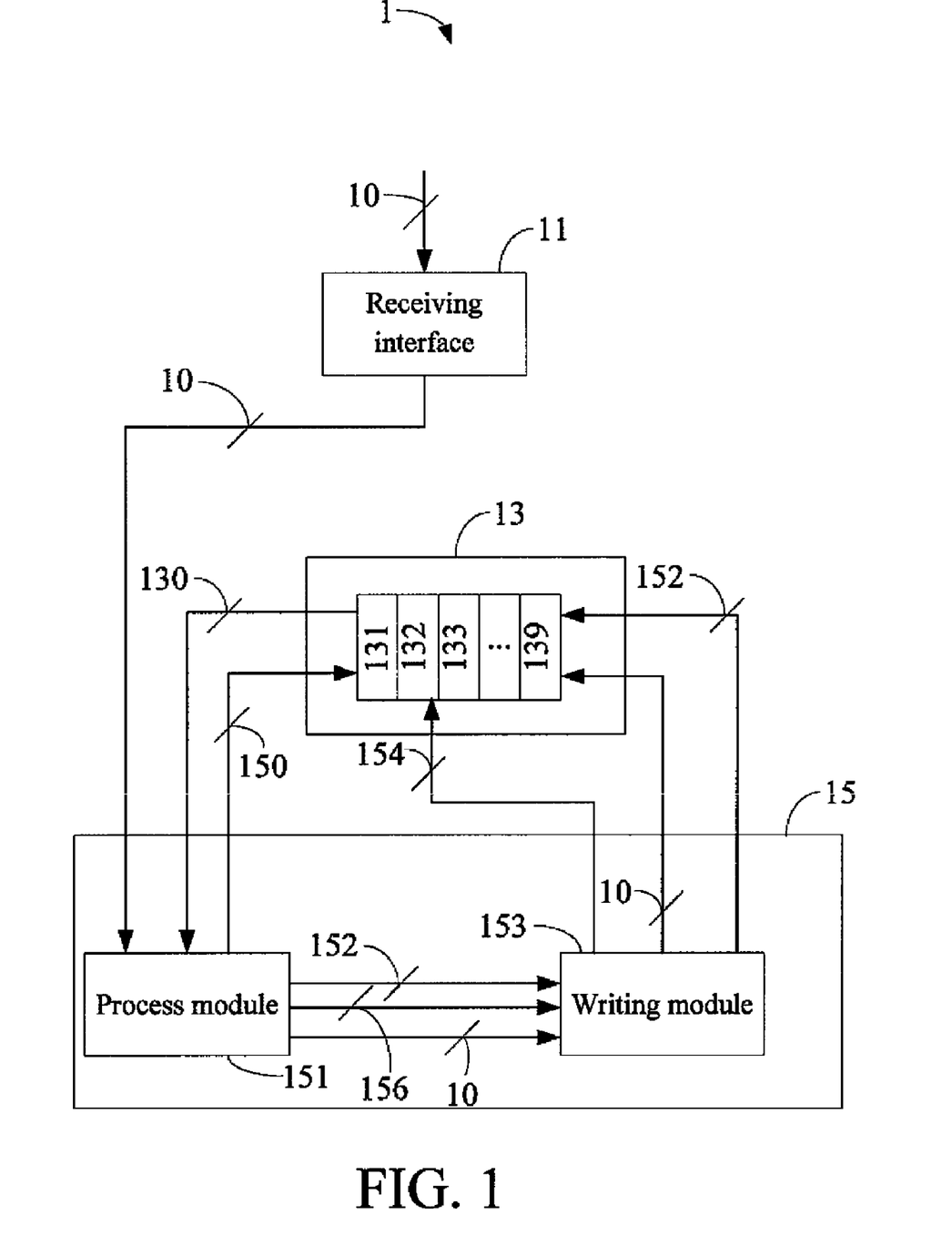
FIG. 1 is a schematic view of a first embodiment of the present invention.

FIG. 1 depicts a first preferred embodiment of the present invention, which is a data storage system 1 comprising a receiving interface 11, a storage apparatus 13, and an intermediary apparatus 15.

In this preferred embodiment, the data storage system 1 is to work with a radio frequency identification (RFID) reader (not shown). In other words, the receiving interface 11 is compatible with the RFID reader to receive data generated by the RFID reader. In this embodiment, data to be stored in the data storage system 1 is generated by the RFID reader. However, this is not intended to limit the present invention and in other embodiments, the receiving interface 11 may also be compatible with other data source and the data storage system 1 may further be used in combination with other data sources.

The receiving interface 11 receives a data 10, which has an index information 150 and a data signature value. In this preferred embodiment, the data 10 received by the receiving interface 11 is generated by the RFID reader upon sensing one or more RFID tags. Content of the data comprises a reader ID, an antenna ID, a read time, and a tag ID. According to the reader ID, the antenna ID, and the read time, the storage apparatus 13 stores the data sensed by the RFID reader in a grid indexing method to facilitate management. However, in other embodiments, the index database may be created based on an AVL tree indexing method or other indexing methods, which will be readily appreciated by those skilled in the art and, thus, will not be further described herein.

As described above, the data 10 in this preferred embodiment includes the reader ID, the antenna ID, the read time, and the tag ID, so the data signature value of the data is generated according to the reader ID, the antenna ID, the read time, and the tag ID.

Next, how the data 10 is stored in the storage apparatus 13 will be described. The storage apparatus 13 has a plurality of storage zones 131, 132, 133, ..., 139, and each of which may be considered as a leaf node or a cell node in the database. Each of the storage zones 131, 132, 133, ..., 139 has a signature field and a count field. Each of the signature fields is adapted to store a first signature value which is generated by performing a calculation on the data stored in the corresponding storage zone, and the count field is adapted to store a count value which indicates a data amount stored in the corresponding storage zone.

The intermediary apparatus 15 is configured to store the received data 10 into the storage apparatus 13. The intermediary apparatus 15 comprises a processing module 151 and a writing module 153. The processing module 151 is configured to search out a storage zone (i.e., the storage zone 131), in which the data 10 is to be stored, from the storage apparatus 13 according to the index information 150. Specifically, since the storage apparatus 13 creates the grid index according to the reader ID, the antenna ID, and the read time, the index information 150 of the data 10 is the reader ID, the antenna ID, and the read time relating to the data 10.

After the data 10 stored in the storage zone 131 have been searched out by the processing module 151, the processing module 151 extracts a first signature value 130 from the signature field of the storage zone 131, and generates a second signature value 152 according to the data signature value of the data 10 and the first signature value 130. Then by comparing the first signature value with the second signature value, the processing module 151 determines that the data 10 has not been stored in the storage zone yet, which is referred to as a determination result 156. In response to the determination result 156, the writing module 153 writes the data 10 into the storage zone 131. Further, the writing module 153 updates the signature field according to the second signature value 152, e.g., writing the second signature value 152 into the signature field.

Figure 2:
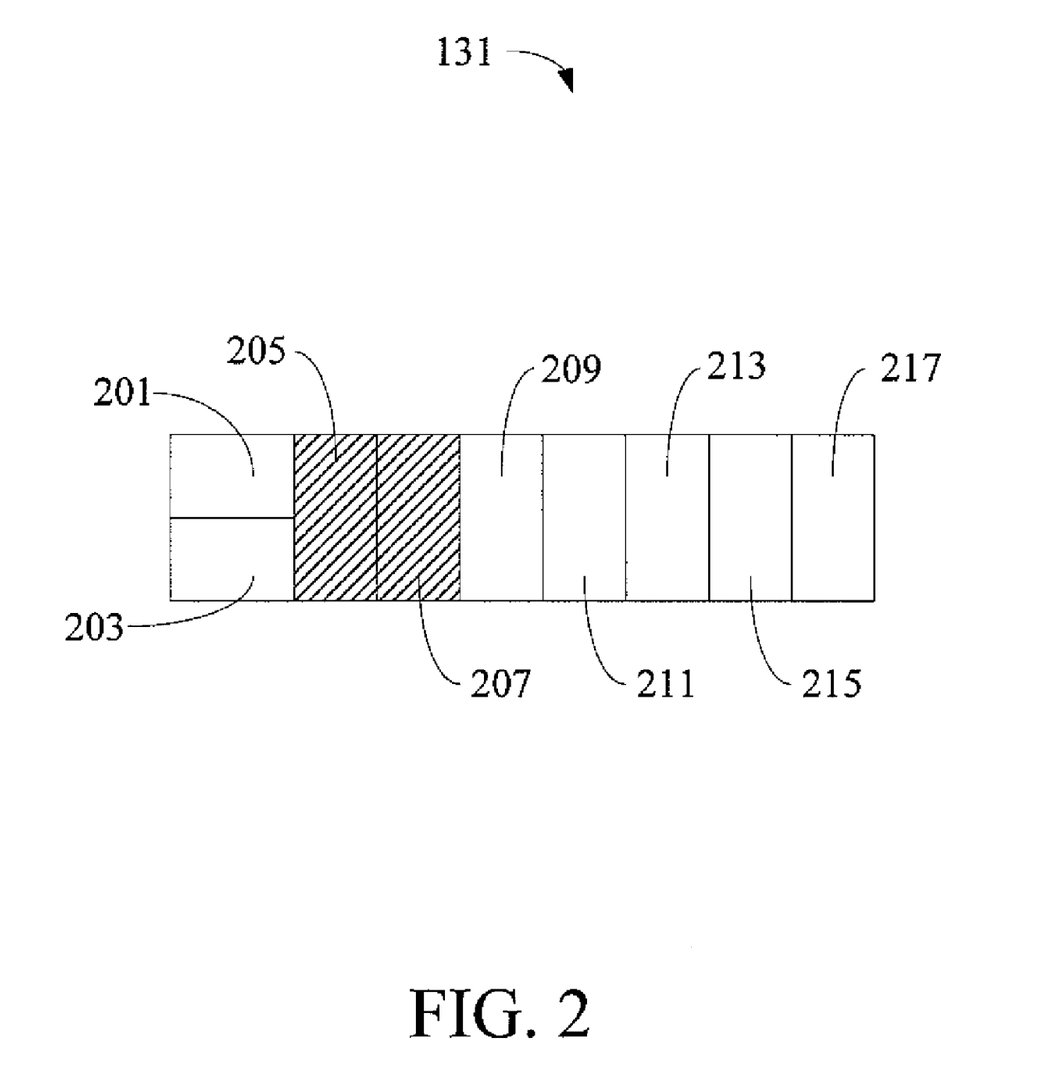
FIG. 2 is a schematic view of a storage zone of the first embodiment.

Please refer to FIG. 2 together, which is a schematic view of the storage zone 131. More specifically, the storage zone 131 comprises a count field 201, a signature field 203, and a plurality of data fields 205, 207, ..., 217. Each of the data fields 205, 207 stores a data respectively, while none of the other data fields 209, 211, ..., 217 stores any data. Hence, the storage zone 131 currently only stores two data, and the count field 201 has a count value of 2.

Initially (i.e. when the storage zone 131 has not stored any data yet), the first signature value stored in the signature field 201 may be empty or 0. Thereafter, the first signature value of the signature field 201 is generated by performing an operation on the previous first signature value and the data signature value of the data which is to be stored. For convenience of illustration, the operation performed in this preferred embodiment is a logic OR operation, although it is not merely limited thereto.

It should be noted that, the content specifications and generation of the signature value depend on content features of the data to be stored and the operation to be performed on the data. That is, all or a portion of differences that may well distinguish between different data are selected from the data to be stored as the data signature value. Since content of the data 10 in this preferred embodiment includes the reader ID, the antenna ID, the read time, and the tag ID, the data signature value adapted to distinguish between different pieces of data is generated according to the reader ID, the antenna ID, the read time, and the tag ID.

For convenience of illustration, the data signature value of this embodiment is generated by extracting one byte from each of the reader ID, the antenna ID, the read time, and the tag ID respectively, so the data signature value consists of four bytes and will be denoted in a hexadecimal form hereinafter. A first part (representing the reader ID portion) of the data signature value ranges between 0x0000 to 0xFFFF, a second part (representing the antenna ID portion) of the data signature value ranges between 0x0000 and 0xFFFF, a third part of the data signature value represents a signature value of the read time portion (in seconds), and a fourth part of the data signature value represents a signature value of the tag ID portion.

Taking the storage zone 131 in FIG. 2 as an example, if the first signature value of the signature field 203 has an initial value of 0, then the initial value is represented in the hexadecimal form as 0x0000 0x0000 0x0000 0x0000. It is assumed that the data signature values of a first piece of data and a second piece of data stored in the storage zone 131 are 0x0001 0x0001 0x0001 0x0001 (which represents that the tag No. 1 is read by the reader No. 1 with the antenna No. 1 in the first second) and 0x0001 0x0001 0x0001 0x0002 (which represents that the tag No. 2 is read by the reader No. 1 with the antenna No. 1 in the first second), respectively. Subsequent to two OR operations, the first signature value of the signature field 203 becomes (0x0001 0x0001 0x0001 0x0003). A detailed process of the operations is as follows: in a first operation, an OR operation is performed on the first signature value and the data signature value of the first piece of data, i.e., [(0x0000 0x0000 0x0000 0x0000) OR (0x0001 0x0001 0x0001 0x0001)], which derives a second signature value (0x0001 0x0001 0x0001 0x0001) to be filled into the signature field 203. Next, in a second operation, the first signature value stored in the signature field 203 has been updated as (0x0001 0x0001 0x0001 0x0001), which together with the data signature value of the second piece of data are OR operated, i.e., [(0x0001 0x0001 0x0001 0x0001) OR (0x0001 0x0001 0x0001 0x0002)], which derives a result of (0x0001 0x0001 0x0001 0x0003) bo be filled into the signature field 203 for updating.

Next, how the intermediary apparatus 15 stores the data 10 into the storage zone 131 of the storage apparatus 13 will be further described. As known from the above description, the data 10 is to be stored in the storage zone 131, and it is assumed that the data 10 has a data signature value of 0x0001 0x0001 0x0001 0x0004 (which represents that the tag No. 4 is read by the reader No. 1 with the antenna No. 1 in the first second). Before the data 10 is stored into the storage zone 131 of the storage apparatus 13 via the intermediary apparatus 15, the count field 201 of the storage zone 131 has a count value of 2, and the signature field 203 of the storage zone 131 has a first signature value of 0x0001 0x0001 0x0001 0x0003.

Upon receiving the data 10, the processing module 151 of the intermediary apparatus 15 extracts the data signature value of the data 10, i.e., 0x0001 0x0001 0x0001 0x0004. The processing module 151 performs the logic OR operation on the data signature value (i.e., 0x0001 0x0001 0x0001 0x0004) of the data 10 and the first signature value 130 (i.e., 0x0001 0x0001 0x0001 0x0003) of the storage zone 131, which derives a second signature value 152. i.e., 0x0001 0x0001 0x0001 0x0007.

The second signature value is different from the first signature value 130, which has two meanings: first, the data 10 has not been stored in the storage zone 131, so the data 10 can be stored into the storage zone 131; second, the signature field 203 of the storage zone 131 should be updated by the second signature value 152 after the data 10 is stored. This is referred to as the determination result 156.

After the processing module 151 generates the second signature value 152 and determines that the signature field 203 of the storage zone 131 needs to be updated, the writing module 153 of the intermediary apparatus 15 writes the data 10 into one of the data fields 209, 211, . . . , 217 according to the determination result 156, and updates the first signature value 130 of the signature field 203 into the second signature value 152. In other words, the signature value of the signature field 203 is updated from the first signature value 130 of 0x0001 0x0001 0x0001 0x0003 into the new signature value 152 of 0x0001 0x0001 0x0001 0x0007. On the other hand, once the data 10 is stored into the storage zone, the writing module 153 generates a new count value 154 (having a value of 3) to update the count value stored in the count field 201, i.e., from 2 to 3.

Another case will now be described, where the data 10 is assumed to have a data signature value of 0x0001 0x0001 0x0001 0x0003 (which represents that the tag No. 3 is read by the reader No. 1 with the antenna No. 1 in the first second). After extracting the data signature value from the data 10, the processing module 151 performs a logic OR operation on the data signature value and the first signature value 130 (having a value of 0x0001 0x0001 0x0001 0x0003) currently stored in the storage zone 131, which derives a second signature value 152 of 0x0001 0x0001 0x0001 0x0003. This implies that, firstly, data identical to the data 10 may possibly have already existed in the storage zone; and secondly, the signature field 203 of the storage zone needs not to be updated.

To ascertain whether the data 10 has been stored in the storage zone or not, the processing module 151 searches the data fields 205, 207, . . . , 217 of the storage zone 131. The searching operation may be accomplished by a binary searching approach, a linear searching approach, or the like. The scope of the present invention is not limited by the searching approach. If it is ascertained that the data 10 has not been stored in the storage zone, then the data 10 is then stored and the count value of the count field 201 of the storage zone is incremented by 1; otherwise, if the data 10 has already been stored in the storage zone, the data 10 will not be stored.

In another example of this preferred embodiment, the operation performed on the signature values is an RANGE operation. For convenience of description, the RANGE operation in this embodiment is realized by the tag ID and divides the tag ID range into a plurality of sub-ranges. In each of the sub-ranges, one bit is used to indicate whether data corresponding to this sub-range has been stored. If so, the bit is assigned a value of 1; otherwise, the bit is assigned a value of 0. Bits corresponding to these sub-ranges are all stored in the signature field of the storage zone as a first signature value. When new data is to be stored into the storage zone 131, existence of the data will be checked in the corresponding sub-range according to the tag ID of the new data and the first signature value stored in the signature field 203 of the storage zone 131.

If the corresponding bit has a value of 0, which represents that no data corresponding to the sub-range has been stored in the storage zone 131, the new data is allowed to be stored. Accordingly, the corresponding bit is updated to a value of 1, and the count value of the count field is incremented by 1.

Conversely, if the bit corresponding to the sub-range where the new data is to be stored has a value of 1, which represents that this data may possibly have been stored in the storage zone 131, each pieces of data in the storage zone 131 will be checked to determine whether this data has surely been stored. If not, it is allowed to be stored into the storage zone 131 and the count value of the count field is incremented by 1. Otherwise, the new data will not be stored.

For example, if the tag ID ranges from 1 to 1000 and is divided into sub-ranges with an interval of 100, there will be 10 sub-ranges and the first signature value 130 of the signature field 203 has an initial value of 0000000000. Here, each bit of the first signature value 130 represents a storage status of a corresponding sub-range respectively, so the first signature value 130 of 0000000000 represents that no data exists in the whole storage zone 131. When the data 10 which has a data signature value with a tag ID of 195 is to be stored into the storage zone 131, the processing module 151 performs an RANGE operation on the data signature value of the data 10 and the first signature value 130 of the signature field 203 to derive a second signature value of 0000000010. Then, the processing module 151 determines whether the data 10 has already been stored in the storage zone 131 by comparing the first signature value 130 with the second signature value. As difference exists between the first signature value 130 and the second signature value, the processing module 151 ascertains that the data 10 has not been stored in the storage zone 131 yet. Accordingly, the data 10 is then stored into the storage zone 131, and the signature value of the signature field 203 is updated by the second signature value, i.e., 0000000010.

Subsequently, if another piece of data having a tag ID of 165 remains to be stored into the storage zone 131, the processing module 151 performs the RANGE operation on the data signature value of the data and the first signature value (now having a value of 0000000010) of the signature field 203. As the tag ID of 165 and the tag ID of 195 belong to a same sub-range, the second signature value thus generated is still 0000000010. In this case, the first and the second signature values are identical to each other, which implies that: firstly, data identical to this data may possibly have already existed in the storage zone 131; and secondly, the signature field 203 of the storage zone 131 needs not to be updated.

To ascertain whether the data has indeed existed in the storage zone 131, the processing module 151 searches the data in all the data fields 205, 207, . . . , 217 of the storage zone 131. The searching operation may be accomplished by a binary searching method, a linear searching method, or the like. The scope of the present invention is not limited by this. If it is ascertained that this data has not been stored in the storage zone 131, then this data is stored and the count value of the count field 201 is incremented by 1; otherwise, if this data has already existed in the storage zone 131, the data will not be stored.

Figure 3A:
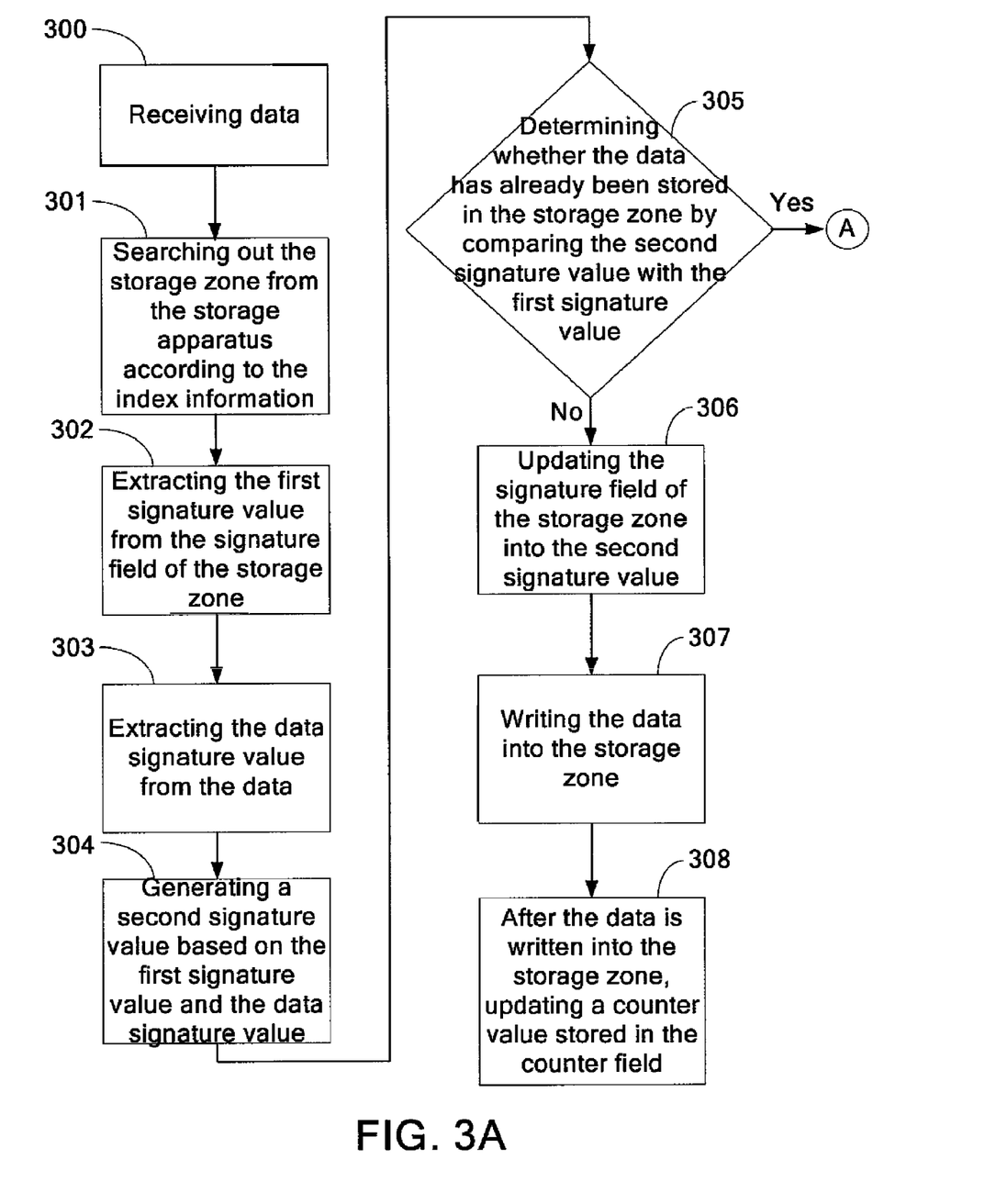
FIG. 3A is a partial flow diagram of a second embodiment of the present invention.
Figure 3B:
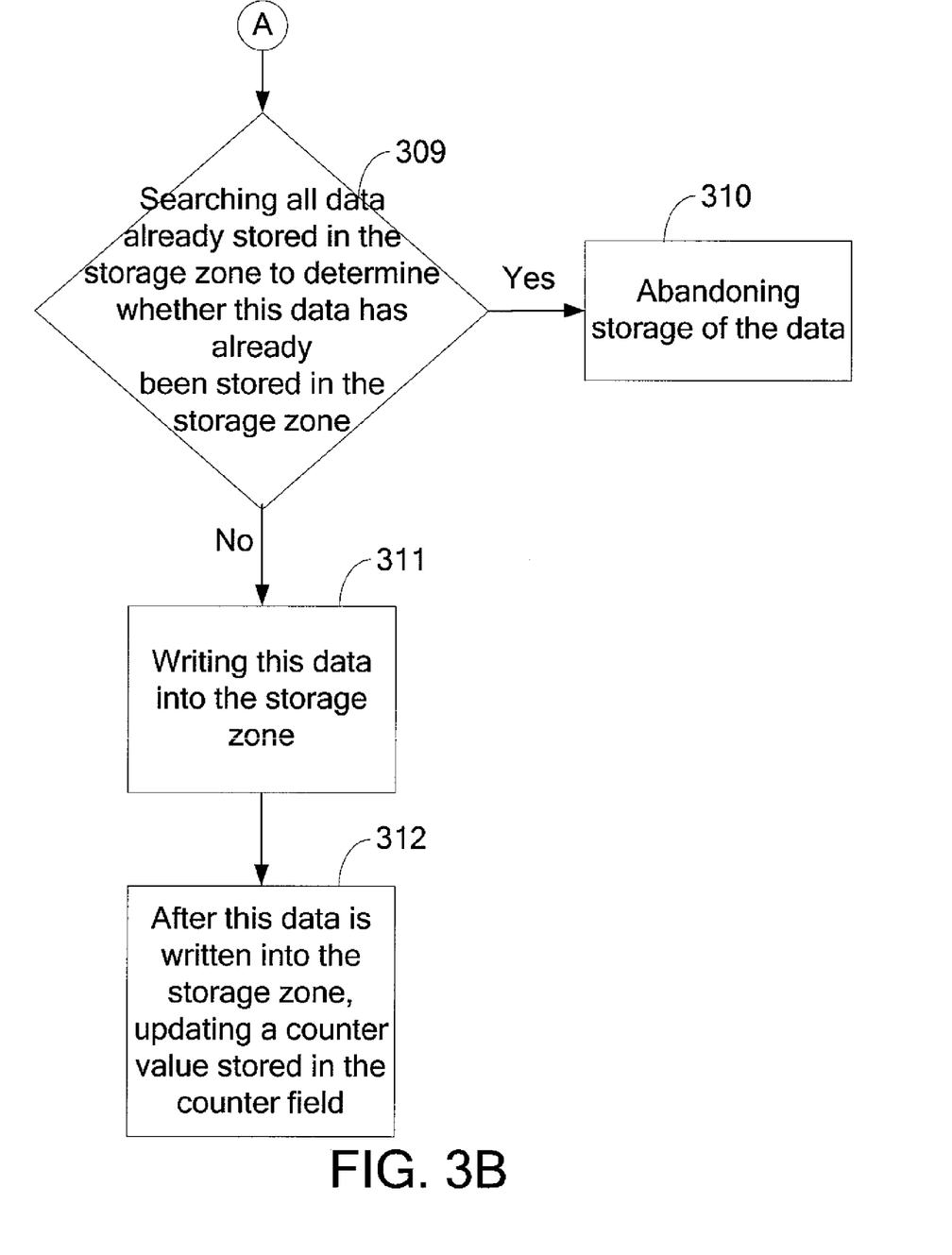
FIG. 3B is another partial flow diagram of the second embodiment of the present invention.

FIGS. 3A and 3B depict a second embodiment of the present invention, which is an intermediary method for storing a data in a storage apparatus. This method is applicable to the data storage system 1 of the first embodiment. The storage apparatus has a storage zone with a signature field.

Referring first to FIG. 3A, this method begins with step 300, where data having index information and a data signature value is received. Then step 301 is executed to search the storage zone from the storage apparatus according to the index information. Step 302 is executed to extract the first signature value from the signature field of the storage zone. Next, step 303 is executed to extract the data signature value from the data. Subsequently, step 304 is executed to generate a second signature value according to the first signature value and the data signature value. Then, step 305 is executed to determine whether the data has already been stored in the storage zone by comparing the second signature value with the first signature value. In other words, step 305 can be considered to be executed to compare first signature value with second signature value to check whether they are same or not.

If not, step 306 is executed to update the signature field according to the second signature value, and step 307 is executed to write the data into the storage zone. After the data is written into the storage zone, step 308 is executed to update a count value stored in the count field. Here, the count value indicates a data amount already stored in the storage zone.

Conversely, if so, reference may be made to FIG. 3B. Step 309 is executed to search all data already stored in the storage zone to determine whether this data has already been stored in the storage zone. If so, step 310 is executed to abandon storage of the data. Otherwise, if this data has not been stored in the storage zone, step 311 is executed to write this data into the storage zone. After this data is written into the storage zone, step 312 is executed to update a count value stored in the count field.

In addition to the aforesaid steps, the second embodiment can also execute all the operations and functions of the first embodiment. Those skilled in the art will readily know how the second embodiment executes the corresponding operations and functions based on the explanation of the first embodiment, and thus, no further description will be given herein.

The intermediary method described in the second embodiment may be realized by a computer program product. When the computer program product is loaded in a computer and a plurality of instructions contained therein is executed, the method of the second embodiment will be accomplished. This computer program product may be stored in a computer readable medium, such as a read only memory (ROM), a flash memory, a floppy disk, a hard disk, a compact disk, a mobile disk, a magnetic tape, a database accessible to networks, or any other storage media with the same function and well known to those skilled in the art. Additionally, the computer program product may also be transmitted through a network.

The present invention determines whether data has already been stored in a storage zone of a storage apparatus by performing an operation on a first signature value stored in a signature field of the corresponding storage zone and a data signature value of the data itself. Accordingly, when new data is to be stored in the storage zone, it is unnecessary to compare the new data with each data already stored in the storage zone to confirm whether the new data has already been stored. Hence, the time for storing the data into the database is effectively reduced, thus overcoming the shortcoming of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An intermediary apparatus for storing data in a storage apparatus, the storage apparatus having a storage zone, the storage zone having a signature field storing a first signature value and a data field for storing the data, the data having an index information and a data signature value, the intermediary apparatus comprising:
   a processing module, being configured to search out the storage zone from the storage apparatus according to the index information, and extract the first signature value from the signature field of the storage zone, generate a second signature value according to the data signature value of the data and the first signature value, and determine that the data has not been stored in the data field of the storage zone by comparing the first signature value with the second signature value; and
   a writing module, being configured to write the data into the data field of the storage zone and write the second signature value into the signature field of the storage zone to replace the first signature value.

2. The intermediary apparatus as claimed in claim 1, wherein the storage zone further has a count field, the writing module is further configured to update a count value stored in the count field after the data has been written into the storage zone, and the count value is configured to indicate a data amount stored in the storage zone.

3. The intermediary apparatus as claimed in claim 1, wherein the index information conforms to one of a grid indexing method and an AVL tree indexing method.

4. The intermediary apparatus as claimed in claim 1, wherein the processing module generates the second signature value by performing one of a logic OR operation and a RANGE operation on the data signature value and the first signature value.

5. An intermediary method for storing data in a storage apparatus, the storage apparatus having a storage zone, the storage zone having a signature field storing a first signature value and a data field for storing the data, the data having an index information and a data signature value, the intermediary method comprising the following steps of:
   (a) searching out the storage zone from the storage apparatus according to the index information;
   (b) extracting the first signature value from the signature field of the storage zone;
   (c) extracting the data signature value from the data;
   (d) generating a second signature value according to the first signature value and the data signature value;
   (e) determining that the data has not been stored in the data field of the storage zone by comparing the second signature value with the first signature value;
   (f) writing the data into the data field of the storage zone in response to the step (e); and
   (g) writing the second signature value into the signature field of the storage zone to replace the first signature value.

6. The intermediary method as claimed in claim 5, wherein the storage zone further has a count field, and the intermediary method further comprises the following step of:
   (h) updating a count value stored in the count field after the data has been written into the storage zone, and the count value is configured to indicate a data amount stored in the storage zone.

7. The intermediary method as claimed in claim 5, wherein the index information conforms to one of a grid indexing method and an AVL tree indexing method.

8. The intermediary method as claimed in claim 5, wherein the step (d) generates the second signature value by performing one of a logic OR operation and a RANGE operation on the data signature value and the first signature value.

9. A non-transitory computer readable medium, storing a program of an intermediary method for storing data in a storage apparatus, the storage apparatus having a storage zone, the storage zone having a signature field storing a first signature value and a data field for storing the data, the data having an index information and a data signature value, the program executing:
   a first code for searching out the storage zone from the storage apparatus according to the index information;
   a second code for extracting the first signature value from the signature field of the storage zone;
   a third code for extracting the data signature value from the data;
   a fourth code for generating a second signature value according to the data signature value and the first signature value;
   a fifth code for determining that the data has not been stored in the data field of the storage zone by comparing the second signature value with the first signature value;
   a sixth code for writing the data into the data field of the storage zone in response to the fifth code; and
   a seventh code for writing the second signature value into the signature field of the storage zone to replace the first signature value.

10. The non-transitory computer readable medium as claimed in claim 9, wherein the storage zone further has a count field and the program further executes:
    an eighth code for updating a count value stored in the count field after the data has been written into the storage zone, and the count value is configured to indicate a data amount stored in the storage zone.

11. The non-transitory computer readable medium as claimed in claim 9, wherein the index information conforms to one of a grid indexing method and an AVL tree indexing method.

12. The non-transitory computer readable medium as claimed in claim 9, wherein the fourth code generates the second signature value by performing one of a logic OR operation and a RANGE operation on the data signature value and the first signature value.

13. A data storage system, comprising:
    a receiving interface, being configured to receive a data, wherein the data has an index information and a data signature value;
    a storage apparatus having a storage zone, the storage zone having a signature field storing a first signature value and a data field for storing the data; and
    an intermediary apparatus, being configured to store the data in the storage apparatus, the intermediary apparatus comprising:
      a processing module, being configured to search out the storage zone from the storage apparatus according to the index information, extract the first signature value from the signature field of the storage zone, generate a second signature value according to the data signature value of the data and the first signature value, and determine that the data has not been stored in the data field of the storage zone by comparing the first signature value with the second signature value; and
      a writing module, being configured to write the data into the data field of the storage zone and write the second signature value into the signature field of the storage zone to replace the first signature value.

14. The data storage system as claimed in claim 13, wherein the storage zone further has a count field, the writing module is further configured to update a count value stored in the count field after the data has been written into the storage zone, and the count value is configured to indicate a data amount stored in the storage zone.

15. The data storage system as claimed in claim 13, wherein the index information conforms to one of a grid indexing method and an AVL tree indexing method.

16. The data storage system as claimed in claim 13, wherein the processing module generates the second signature value by performing one of a logic OR operation and a RANGE operation on the data signature value and the first signature value.

17. The data storage system as claimed in claim 13, wherein the storage apparatus is a database, and the storage zone is one of a leaf node and a cell node.

\* \* \* \* \*